US012056770B2

(12) United States Patent
O'Hara et al.

(10) Patent No.: US 12,056,770 B2
(45) Date of Patent: *Aug. 6, 2024

(54) COMPUTING SYSTEM FOR OPTIMIZING INVESTMENT OF LIQUID GUARANTEED INCOME ASSETS

(71) Applicant: BlackRock, Inc., New York, NY (US)

(72) Inventors: Matthew O'Hara, San Francisco, CA (US); Daniel Yem, New York, NY (US); Daniel Basile, New York, NY (US)

(73) Assignee: BlackRock, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/178,354

(22) Filed: Mar. 3, 2023

(65) Prior Publication Data

US 2023/0206339 A1 Jun. 29, 2023

Related U.S. Application Data

(63) Continuation of application No. 16/789,115, filed on Feb. 12, 2020, now Pat. No. 11,605,131.

(60) Provisional application No. 62/804,713, filed on Feb. 12, 2019.

(51) Int. Cl.
*G06Q 40/06* (2012.01)
(52) U.S. Cl.
CPC .................................. *G06Q 40/06* (2013.01)
(58) Field of Classification Search
CPC .................................................... G06Q 40/06
See application file for complete search history.

(56) References Cited

U.S. PATENT DOCUMENTS

| 5,812,987 | A | 9/1998 | Luskin et al. | |
| 6,336,102 | B1 | 1/2002 | Luskin et al. | |
| 7,249,077 | B2 * | 7/2007 | Williams | G06Q 40/06 705/35 |
| 8,645,254 | B2 | 2/2014 | Castille et al. | |
| 10,223,749 | B2 * | 3/2019 | Greenshields | G06Q 40/06 |
| 11,605,131 | B1 * | 3/2023 | O'Hara | G06Q 40/06 |
| 2006/0085338 | A1 * | 4/2006 | Stiff | G06Q 40/06 705/40 |
| 2008/0154792 | A1 * | 6/2008 | Maggioncalda | G06Q 40/02 705/36 R |
| 2010/0153296 | A1 * | 6/2010 | Volpert | G06Q 40/06 705/36 R |
| 2010/0293082 | A1 * | 11/2010 | Benham | G06Q 40/00 705/35 |
| 2010/0299160 | A1 * | 11/2010 | Roscoe | G06Q 40/06 705/37 |
| 2014/0108296 | A1 | 4/2014 | O'Hara et al. | |

(Continued)

*Primary Examiner* — Bruce I Ebersman
*Assistant Examiner* — Matthew Cobb
(74) *Attorney, Agent, or Firm* — Haynes and Boone, LLP

(57) ABSTRACT

An investment manager engine automatically manages an investment fund. During an accumulation phase, the investment manager receives messages that include contributions to the investment fund. For each contribution, the investment manager determines an allocation of the contribution among securities and guaranteed income assets. The investment manager allocates at least a portion of the contribution to guaranteed income assets, according to the determined allocation. The guaranteed income assets provide a guaranteed annual income stream upon a predetermined date.

20 Claims, 12 Drawing Sheets

(56) References Cited

U.S. PATENT DOCUMENTS

| | | | |
|---|---|---|---|
| 2015/0066811 A1* | 3/2015 | Legare | G06Q 40/06 |
| | | | 705/36 R |
| 2015/0127581 A1 | 5/2015 | Castille, III et al. | |
| 2015/0178846 A1* | 6/2015 | Feinschreiber | G06Q 40/06 |
| | | | 705/36 R |
| 2017/0011462 A1* | 1/2017 | Anliker | G06Q 40/06 |

* cited by examiner

COMPUTING SYSTEM FOR OPTIMIZING INVESTMENT OF LIQUID GUARANTEED INCOME ASSETS

CROSS REFERENCE TO RELATED APPLICATIONS

This application claims priority to U.S. Provisional Appl. No. 62/804,713, filed on Feb. 12, 2019 and to U.S. Non-Provisional Appl. No. 16/789,115, filed on Feb. 12, 2020, now allowed, which is incorporated by reference in its entirety.

FIELD

The disclosure relates to a computing system that optimizes guaranteed income assets, and more specifically, to optimizing investment of liquid guaranteed income assets.

BACKGROUND

Typical investment funds do not include allocations to an asset class that enables investors in the fund to receive a guaranteed income stream when they sell (or "redeem") their investment in the fund. One technique to acquire a guaranteed income stream in an investment fund is to invest the assets of the fund into an annuity contract, e.g., a group deferred income annuity offered by an insurance company. However, this technique has various drawbacks. Group annuities are neither practically tradeable on daily basis nor fully price transparent. Furthermore, group annuities are not sufficiently liquid to meet regulatory criteria, such as enabling an investment fund including a group annuity to qualify as a Qualified Default Investment Alternative (QDIA) under the Employee Retirement Income Security Act of 1974 (ERISA).

Evaluating the transactable market value of assets that are convertible into future guaranteed income is difficult to practically implement. Investment managers may be constrained in the extent to which they can assess and optimize investment decisions with respect to such assets.

The figures depict various embodiments of the present disclosure for purposes of illustration only. One skilled in the art will readily recognize from the following description that alternative embodiments of the structures and methods illustrated herein may be employed without departing from the principles, or benefits touted, of the disclosure described herein.

SUMMARY

An investment manager engine electronically manages an investment fund on behalf of an investor. The investment fund includes one or more portfolios of assets, such as stocks, bonds, guaranteed income assets, and/or other securities. The investment manager engine receives series of contributions to the investment fund. For each contribution, the investment manager engine determines an allocation of the contribution among assets in the portfolios of the investment fund. The investment manager engine allocates a portion of the contribution to guaranteed income assets according to the determined allocation. The guaranteed income assets provide a guaranteed annual income stream upon a predetermined time or predetermined time window. Upon the predetermined time or time window, the investment manager engine causes a third-party distribution engine to assign the guaranteed annual income stream to the investor.

DETAILED DESCRIPTION

The figures and the following description relate to embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system or method for purposes of illustration only. One skilled in the art will readily recognize from the following description that alternative embodiments of the structures and methods illustrated herein may be employed without departing from the principles described herein.

Figure 1:
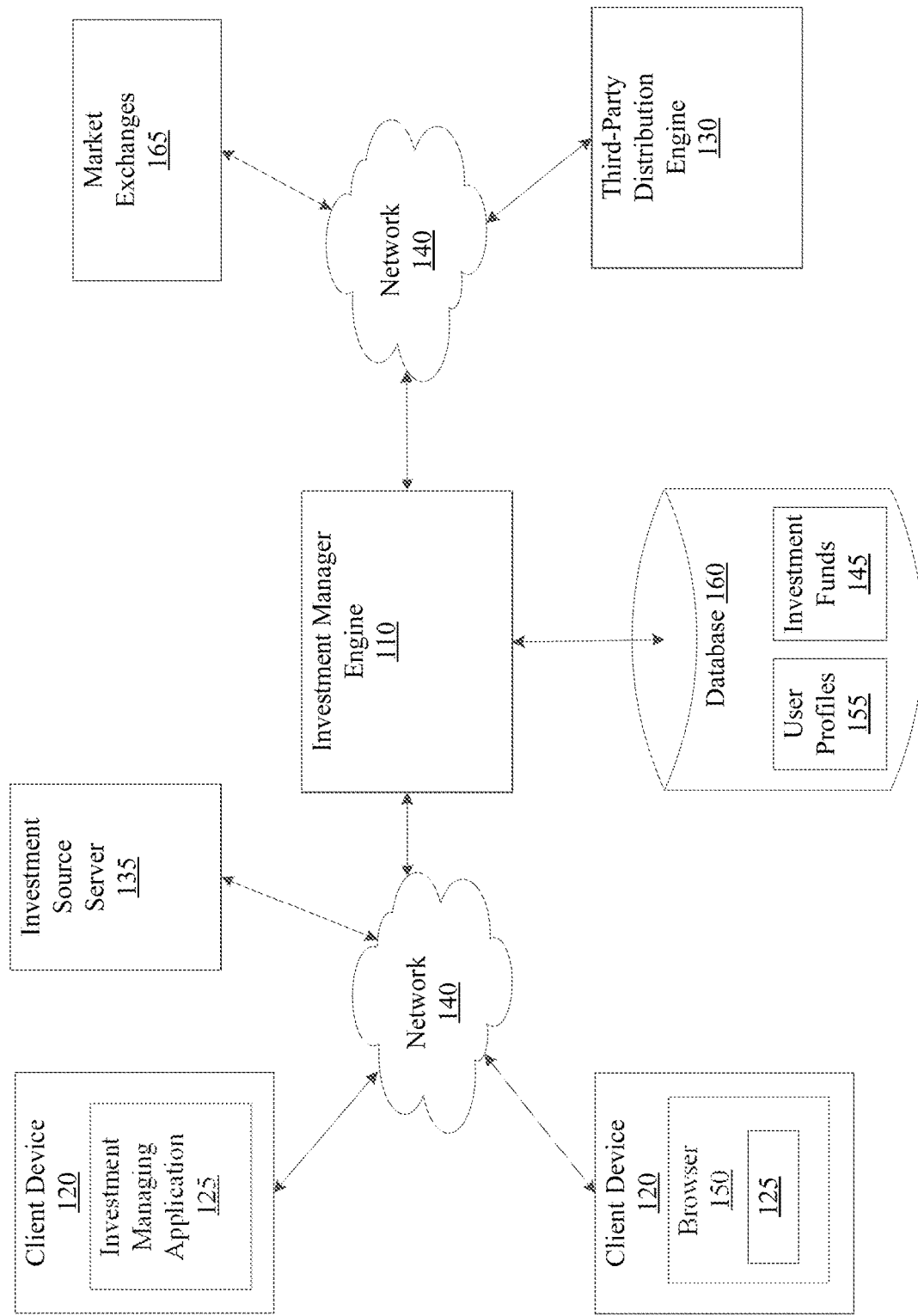
FIG. 1 is a block diagram of a distributed system environment where embodiments can be implemented.

FIG. 1 illustrates a system 100 including a distributed system environment that includes an investment manager engine 110, a client device 120, a third-party distribution engine 130, an investment source server 135, and market exchanges 165 connected by one or more networks 140.

The network 140 may comprise any combination of local area and wide area networks employing wired or wireless communication links. Network 140 uses standard communications technologies and protocols. For example, network 140 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any format, such as hypertext markup language (HTML) or extensible markup language (XML). In some embodiments, all or some of the communication links of the network 140 may be encrypted. The investment manager engine 110, client device 120, third-party distribution engine 130, investment source server 135, and market exchanges interact with one another via the network 140, such as to send and receive messages that include instructions for sending or receiving payments.

Client device 120 may be a portable or non-portable electronic device under the control of a user, and configured to transmit and receive messages with instructions over network 140. Example client device 120 may include a smartphone, a portable electronic reading device, such as an electronic book reader, a tablet, a laptop computer, a wearable electronic device, eyeglasses that can be incorporated into an electronic device, an electronic watch, etc. Client device 120 may also include and execute operating systems, such as iOS, Android, Unix, Linux, Microsoft Windows, etc. There may be multiple client devices 120 connected to network 140. One or more components that may be included in the client device 120 may be described in detail in FIG. 11.

Client device 120 may include or execute an investment managing application 125. Investment management application 125 may be downloaded from another computing device (not shown) connected to network 140 or be otherwise installed on client device 120 using portable memory storage devices, such as a compact disk or a thumb drive. Once investment managing application 125 is installed on client device 120, client device 120 may receive input, e.g. user input or computer input that may activate investment managing application 125 on client device 120 and cause investment managing application 125 to communicate with other components in network 140.

Client device 120 may also include a browser 150. Browser 150 may be an application executing on client device 120 that retrieves and presents information resources that are stored on the Internet or the World Wide Web and are retrieved using network 140. An information resource may be identified by a uniform resource identifier (URI) or a uniform resource locator (URL) and may be a webpage, an image, a video, or another type of content. Investment managing application 125 stored at a URI or URL address may be an information resource. Browser 150 may retrieve a URL associated with the webpage of the investment managing application 125 and display the webpage that includes investment managing application 125 on the electronic display of client device 120.

Investment managing application 125 may register a user, e.g. an investor, with investment manager engine 110 and provide the investor with an interface that may be used to send and receive data and/or instructions to/from investment manager engine 110. To register with investment manager engine 110, investment managing application 125 may receive user data, such as user name, address, age, etc. Investment managing application 125 or investment manager engine 110 may use the user data to generate a user profile 155 and store the user profile 155 in a database 160 or another memory storage conducive to storing large amount of data. User profile 155 may also include a user identifier, such as a numeric, alphanumeric, etc., identifier that may uniquely identify the user within investment manager engine 110 and link the user to one or more investment funds 145. Investment managing application 125 may also receive user credentials, such as user name and password for accessing investment managing application 125 and interfacing with investment manager engine 110. Investment managing application 125 or investment manager engine 110 may also store user credentials in user profile 155 or in another secure memory storage. Once the user registers with investment managing application 125, investment managing application 125 provides a user with access to investment manager engine 110.

Investment manager engine 110 may be a computing device or software executing on the computing device that electronically manages investment funds 145 on behalf of investors or users that are associated with user profiles 155. Each investment fund 145 may be associated with one or more users. Investment manager engine 110 may electronically manage investment funds 145 according to methodologies and algorithms that execute within investment manager engine 110 and act on investment funds 145, according to manual input, or a combination of both. The investment manager engine 110 may receive monetary contributions that are associated with the user, e.g., an investor and use the monetary contributions to purchase one or more assets in asset classes. Example assets may be stocks, bonds, private securities, and/or guaranteed income assets. Any combination of asset classes may comprise one or more investment portfolios of investment fund 145. Investment manager engine 110 may reallocate funds in the investment fund 145 across assets to optimize return on investment, minimize risk, and so on, and may determine whether to purchase or sell particular assets based on various analyses, as described below.

Investment managing application 125 may cause investment manager engine 110 to receive monetary contributions from an investment source server 135. The investment source server 135 may store funds allocated to a user and be a source of monetary contributions received by investment manager engine 110. Investment source server 135 may receive instructions via a message communicated over network 140, such as from a user who allocates a portion of each paycheck that has funds stored at the investment source server 135. The message may include instructions that cause investment source server 135 to transmit a message with a monetary contribution to the investment fund 145 associated with user profile 155. Investment fund 145 may offer one or more investment options, such as a target date fund. In another example, investment source server 135 may also receive instructions from investment managing application 125 or another computing device to transfer a monetary contribution to investment manager engine 110 and to investment fund 145 associated with the user profile 155.

Investment source server 135 may alternatively or additionally store funds associated with a business, charity, university, or other organization that makes monetary contributions to the investment fund 145 on behalf of, and for the benefit of the individual investor. For example, an employer of the investor may be associated with the investment source server 135 and provides instructions to investment source server 135 to periodically add monetary contribution to the investor's investment account, with investment manager engine 130 then allocating the contributions to investment fund 145.

Figure 2:
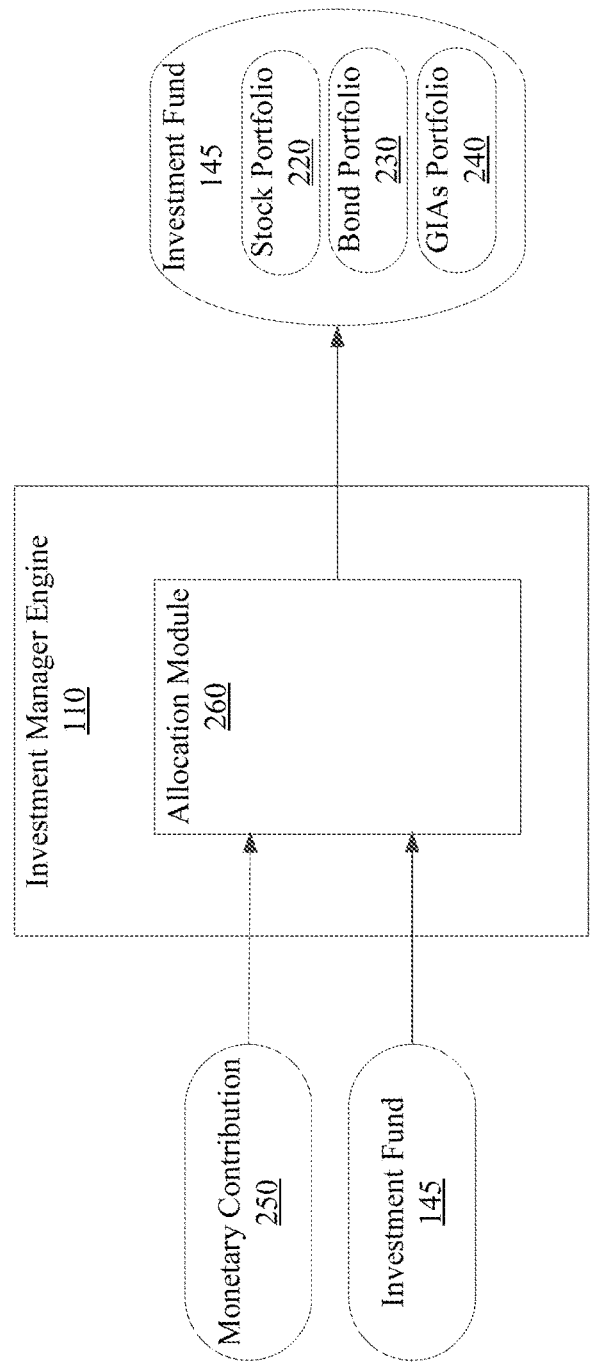
FIG. 2 is a block diagram illustrating an investment manager engine, according to an embodiment.

FIG. 2 illustrates a block diagram 200 of investment manager engine 110 allocating a monetary contribution into an investment fund 145, according to one embodiment. The investment fund 145 may include multiple portfolios that store assets from different asset classes. An example portfolio may be a stock portfolio 220, a bond portfolio 230, or a guaranteed income asset ("GIA") portfolio 240. Stock portfolio 220 may include stocks, and bond portfolio 230 may include bonds. As described below, the GIA portfolio 240 includes guaranteed income asset ("GAI") units that are eventually redeemable for a guaranteed annual income stream at a predetermined time or during a predetermined time window. In alternative embodiments the investment fund 145 may include fewer, additional, or other portfolios of any of a variety of asset classes, including but not limited to those described herein. The investment fund 145 may include any number of distinct assets in addition to the GIA portfolio 240, such as multiple different stocks and/or bonds.

Investment fund 145 may be represented as a computing structure or a database memory structure. An example computing structure may be a software defined object that is linked to other objects. In this case, each investment fund 145 may be a software object that is linked to other investment funds 145 that are also software objects. The objects may also be associated with user profiles 155 of individual investors and may be accessed using a user identifier stored in the user profile 155. Investment manager engine 110 may traverse and act on the investment fund 145 objects or portfolios 220-240 included in the objects. An example memory structure may be a table defined using a schema in a database. Investment funds 145 are represented using database tables that are defined using schemas. In some instances, investment manager engine 110 may retrieve data for investment funds 145 from database 160 and load the data into the investment fund, portfolio, etc., software objects, that are then acted on by investment manager engine 110.

Portfolios 220-240 within the investment fund 145 may also be computing structures or memory structures. For example, stock portfolio 220 may be a computing object that is related to the investment fund computing object and includes multiple computing objects, where each object represents a stock and includes stock data. Bond portfolio 230 may be a computing object that is related to the investment fund computing object and includes multiple computing objects, where each object represents a bond and includes bond data. GIA portfolio 240 may be a computing object that is related to the investment fund computing object and includes multiple computing objects, where each object represents a GIA unit and includes GIA data. An example memory structure may be database tables for portfolios 220-240 that are defined using schemas, a different schema for each portfolio and each asset. The schemas define the database tables that store portfolios, e.g. stock portfolio 220, bond portfolio 230, an GIA portfolio 240 and tables store data associated with stocks, bonds, and GIA assets. In some instances, investment manager engine 110 may retrieve portfolios 220-240 and corresponding data from investment fund and portfolio tables stored in database 160 and load the data into the software objects, that are then acted on by investment manager engine 110.

As discussed above, an investor may make a monetary contribution 250 to investment fund 210 by causing investment managing application 125 to send a message to investment manager engine 110 or through one or more investment source server 135. The contribution may be referred to as a monetary contribution 250. Along with monetary contribution 250, investment manager engine 110 may also receive a user identifier that links monetary contribution 250 to user profile 155. Once investment manager engine 110 receives monetary contribution 250 from investment managing application 125 or an individual or organization making monetary contribution 250 on behalf of, or for the benefit of, the investor such as investment source server 135, investment manager engine 110 may use an allocation module 260 to allocate the monetary contribution 250 among the assets of the investment fund 145.

To allocate the monetary contribution 250, investment manager engine 110 includes an allocation module 260. Allocation module 260 may identify a user profile 155 using the user identifier received with monetary contribution 250. Allocation module 260 may also identify and retrieve investment fund 145 that is associated with user profile 155 from database 160 and purchase additional units of one or more assets (e.g. stocks, bonds, and/or GAIs). For example, user profile 155 may store investment fund identifiers associated with the user. Alternatively, allocation module 260 may retain some or all of the monetary contribution 250 as cash. For example, allocation module 260 may allocate the monetary contribution 250 among the assets of the investment fund 145 according to preset ratios, such as a predetermined strategic allocation. Strategic allocation may be a ratio of allocation among different asset classes, e.g. stocks, bonds, and GIA units or a ratio of values among asset classes. Alternatively, allocation module 260 may receive input that an active manager of the investment fund 145 may coordinate the acquisition of a particular set of assets, e.g., a set of assets selected based on various analyses of asset cost and future value so as to maximize return, minimize risk, or so on. Allocation module 260 may also delay allocating monetary contribution 250 and store monetary contribution 250 as cash rather than immediately purchasing assets. This may occur in embodiments wherein investment manager engine 115 determines that waiting to purchase one or more units of assets is prudent.

Figure 3:
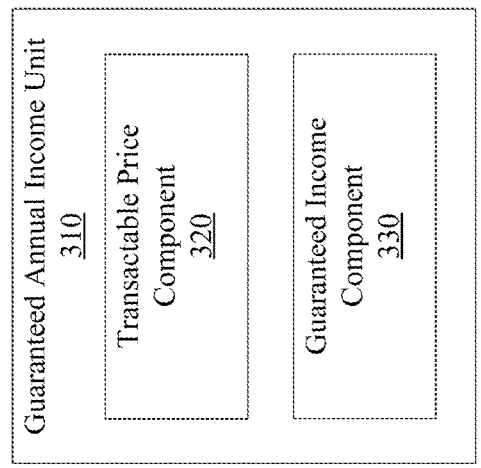
FIG. 3 is a block diagram of a guaranteed annual income unit, according to an embodiment.

FIG. 3 illustrates a block diagram 300 of a guaranteed annual income (GAI) unit, according to an embodiment. GIA unit 310 is an asset in GIA portfolio 240. GIA unit 310 provides future guaranteed annual lifetime income to the investor, paid by a third-party distribution engine 130 (discussed below) upon redemption of the asset at a predetermined future date, time or window of time.

GIA unit 310 includes a transactable price component 320 and a guaranteed annual income component 330. Transactable price component 320 includes a transactable price, where purchasing a unit of the GIA for the transactable price purchases the future guaranteed annual income for life indicated by the guaranteed annual income component 330.

Investment manager engine 110 may define GIA unit 310 as an object that has transactable price component 320 and guaranteed annual income component 330 parameters or a memory structure stored in memory of, or accessible to investment manager engine 110.

Investment fund 145 may include at least one GIA unit 310 along with one or more other assets. GIA units 310, stocks, and bonds may be separated into separate portfolios, such as stock portfolio 220 that including stocks, bond portfolio 230 that includes bonds, and GIA portfolio 240 that includes GIA units 310. In alternative embodiments, the various assets included in the investment fund 145 may be held in one portfolio.

Going back to FIG. 1, distributed system 100 also include third-party distribution engine 130. Third-party distribution engine 130 may be under control of insurance provider or another entity and may be communicatively coupled to investment manager engine 110 over network 140. Third-party distribution engine 130 may distribute a guaranteed income to a user associated with investment fund 145 and also exchange GIA units 310 with investment manager engine 110 as will be discussed below.

Investment manager engine 110 may receive a message from another computing device or application interface of investment manager engine 110 with instructions to convert GIA units 310 in investment fund 145 into guaranteed income. Investment manager engine 110 may also automatically generate the instructions to convert GIA units 310 into guaranteed income when a timer within or coupled to investment manager engine 110 indicates a predefined date, time or window of time. The predefined date, time or window of time may be stored in user profile 155 or in GIA portfolio 240. To convert GIA units 310, investment manager engine 110 may generate and transmit a second message to third-party distribution engine 130. The second message may include a user identifier, a number of GIA units 310 in the GIA portfolio 240 to be converted, and the data associated with GIA units 310. When multiple investors owe GIA units 310 in investment fund 145, the number of GIA units 310 may corresponding to the investor proportionate investment in the investment fund 145. Upon receipt of the second message, third-party distribution engine 130 may process the second message and begin to payout the guaranteed annual income provided by the number of GIA units 310. In some instances, third-party distribution engine 130 may be instructed to automatically pay out the investor at configurable time intervals, e.g. weekly, monthly, semiannually or annually until the third-party distribution engine 130 receives a message indicating the investor's death. In some instances, instead of paying out the annual income guaranteed by their guaranteed income portfolio 240, the third-party distribution engine 130 may pay out a lump sum payment based on the net asset value (NAV) of the GIA units 310 in the guaranteed annual income portfolio 240. Thus, the second message may also instruct the third-party distribution engine 130 to either payout the annual guaranteed income at predetermined time intervals or as a lump sum.

In an embodiment, user profile 155 or GIA portfolio 240 may include a prescribed redemption window. The prescribed redemption window is a time interval during which the investment manager engine 110 may convert the investor interest in GIA portfolio 240 of investment fund 145 to guaranteed income. The prescribed redemption window may be determined using one or more messages communicated between the investment manager engine 110 and the third-party distribution engine 130. The prescribed redemption window may be any period of time depending upon the embodiment, such as within a year after a particular date.

Investment manager engine 110 may convert the investor's interest in the investment fund 145, or the investor's interest in the GIA portfolio 240 into a guaranteed income after a predetermined date or time, or upon the predetermined date or time. The predetermined date may be, for example, a date of particular age of the investor, e.g., the date upon which the investor reaches 59.5 years old, or the investor's $60^{th}$ birthday, or so on. The user profile 155 or GIA portfolio 240 may include the prescribed redemption window, or predetermined date or time and an indicator that indicates whether to convert the investor's interest after a predetermined date, upon the predetermined date, or within the prescribed time period.

Investment manager engine 110 may determine the guaranteed income from GIA portfolio 240. As discussed above, third-party distribution engine 130 may be responsible for paying the annual income. Investment manager engine 110 may determine the size of the annual income based on the number of GIA units 310 in the guaranteed income asset portfolio 240, as well as the annual income guaranteed per GIA unit 310 (specifically, the guaranteed annual income component 330). For example, if each purchased GIA unit 310 guarantees $1 in annual income, and the guaranteed income asset portfolio 240 includes 100,000 GIA units 310, then investment manager engine 110 converts the 100,000 GIA units 310, into $100,000. The annual income, e.g. $1 may be the income if investment manager engine 110 liquidates GIA unit 310 during a prescribed window of time or predetermined date or time. Example date or time may be investor's $65^{th}$ birthday or the year of the investor's $65^{th}$ birthday. If investment manager engine 110 liquidates GIA unit 310 prior to the prescribed window of time or predetermined date or time, the guaranteed value of one GIA unit 310 may be less than $1. In some instances, guaranteed income asset portfolio 240 is associated with multiple investors. In this case the investment manager engine 110 may generate one or more messages to third-party distribution engine 130 that indicate the conversion amount, e.g. $100,000, the user identifiers of the multiple investors, and a portion of the GIA units 310 that are associated with each investor relative to the number of GIA units 310 in GIA portfolio 240. Conversion amount may be determined using an existing index or index created by investment manager engine 110 and/or insurance distribution engine 130. Third-party distribution engine 130 may receive the one or more messages and allocate and distribute funds to the investors relative to the number of GIA units 310 in the investment fund 145 and the net asset value of those GIA units 310. As described below, the price of GIA units may fluctuate. In general, larger investments made earlier in time correspond to more sizeable future annual income streams.

GIA units 310 may be provided, e.g. sold to investment manager engine 110 by the third-party distribution engine 130. In some instances, third-party distribution engine 130 may generate a contract, such as an electronic contract, that provides GIA units 310 for sale to investment manager engine 110 and requires third-party distribution engine 130 to purchase some or all GIA units 310 from the investment fund 145 in the future. Investment manager engine 110 may also indicate the ascertainable and transactable purchase price that is stored in the transactable price component 320.

In an embodiment, the electronic contract may include a reference benchmark determined by the investment manager engine 110 and third-party distribution engine 130. The price of the GIA unit 310 may be based on the reference benchmark. In some instances, the reference benchmark may be an existing published index for securities prices, such as a particular bond index, or may be a composite benchmark derived from combining two or more such securities at a predetermined ratio. The ratio may also be determined by the investment manager engine 110 and the third-party distribution engine 130 and included in the electronic contract. In other instances, the reference benchmark may be an index that investment manager engine 110 and/or third-party distribution engine 110 generate using selected securities. The price of GIA unit 310 is thus subject to daily fluctuation on days in which securities markets are open for trading. These day to day fluctuations are calculated based on changes to the reference benchmark. For example, if the index level of the reference benchmark increases by five percent, the price of one GIA unit 310 also increases by five percent. As discussed above, the electronic agreement may include the transactable price of a unit of the GIA (i.e., the price at which the investment manager engine 110 may purchase the unit from, or sell the unit to, the third-party distribution engine 130) will increase or decrease in proportion to the day-over-day changes in the reference benchmark, including in embodiments where the reference benchmark is a composite benchmark.

In some embodiments, third-party distribution engine 130 may elect, on a day by day basis, to offer a lower price per GIA unit 310 than is set by the index level of the reference benchmark. In such embodiments, the investment manager engine 110 may purchase GIA units 310 at a lower price, rather than the price set by the index level of the reference benchmark.

As discussed above, third-party distribution engine 130 may receive funds from investment manager engine 110 that purchases GIA units 310. Third-party distribution engine 130 may not invest received funds (e.g., payments from the investment manager engine 110 for GIA units 310) according to how the reference benchmark is composed (that is, into the securities included in the reference benchmark at the ratios they are included in the reference benchmark). However, the electronic contract may indicate that the third-party distribution engine 130 must honor the GIA price derived from the reference benchmark, regardless of the third-party distribution engine's 130 de facto return on any investments it has made with the received funds.

The securities constituting the reference benchmark, and the ratios among them, may be renegotiated by the third-party distribution engine 130 and the investment manager engine 110. The third-party distribution engine 130 and the investment manager engine 110 may also agree to change or modify some or all securities in the referenced benchmark.

As discussed in FIG. 2, investment manager engine 110 uses allocation module 260 to allocated monetary contributions 250 to investment fund 145 that includes one or more portfolios 220-240 of assets, such as stocks, bonds, other securities, and GAIs. The investment manager engine 110 also includes a portfolio module for managing portfolios 220-240.

Figure 4:
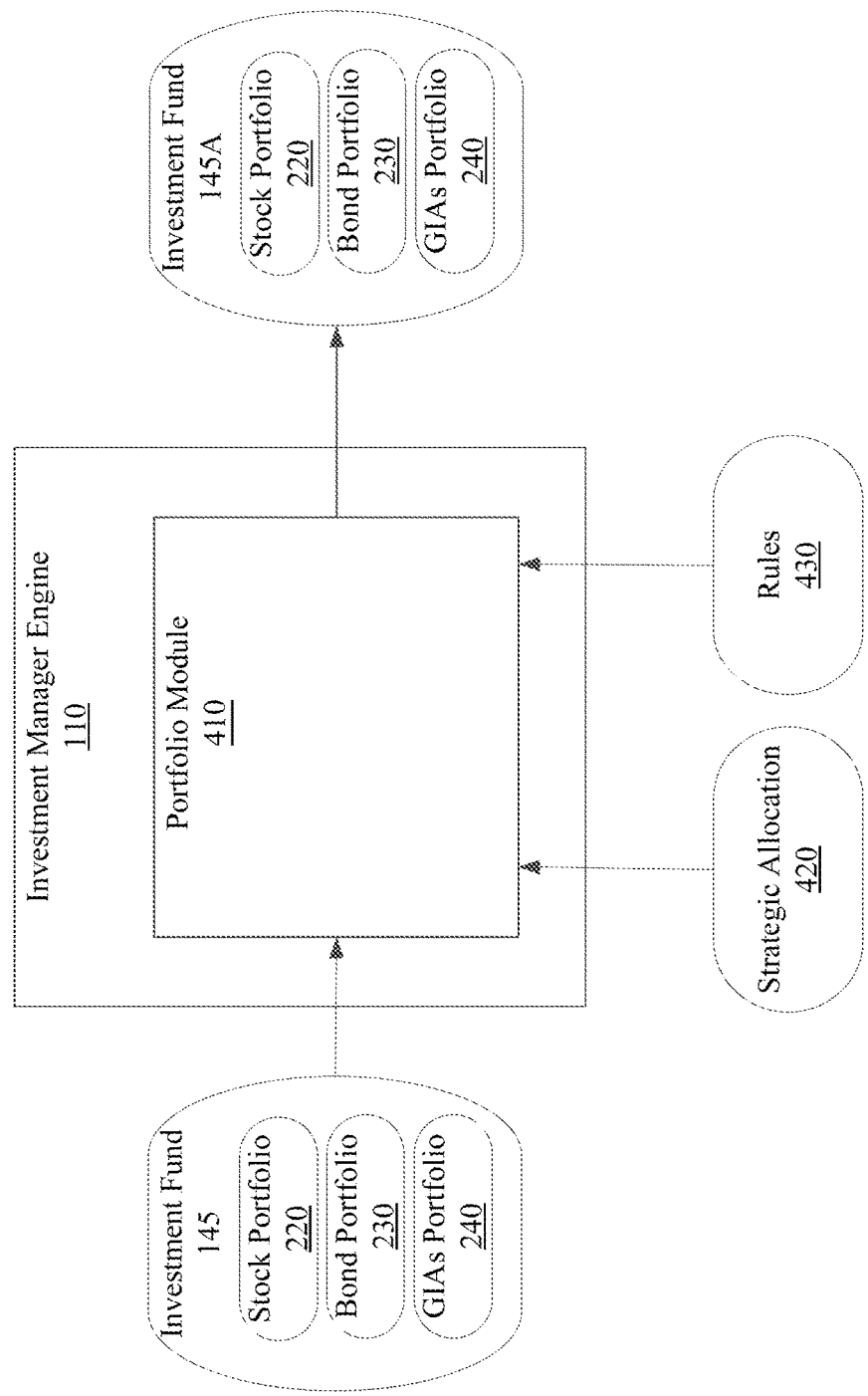
FIGS. 4-6 are block diagrams illustrating an investment manager engine, according to an embodiment.

FIG. 4 is a block diagram 400 illustrating an investment manager engine managing portfolios, according to an embodiment. As illustrated in FIG. 4, investment manager engine 110 includes a portfolio module 410. Portfolio module 410 maintains one or more investment funds 145 on behalf of the one or more investors associated with user profiles 155. Individual investors may have individual investment funds 145, or multiple investors may contribute to the same investment fund 145. In the latter embodiment, redemption of GIA units 310 by one investor from investment fund 145 is proportional to the investor's investment in the investment fund 145. The portfolio module 410 may be used in conjunction with the allocation module 260 to rebalance investment funds.

Investment fund 145 may have a strategic allocation 420, which is a particular ratio of component securities at which the portfolio module 410 generally maintains the investment fund 145. However, due to relative performance of different securities on market exchanges 165, or due to active investment manager engine 110, the composition of the investment fund 145 may stray from the strategic allocation. The portfolio module 410 may rebalance investment fund 145 to bring its composition closer to strategic allocation 420. The portfolio module 410 may rebalance the investment fund periodically, such as once a month, once a quarter, or once a year; upon reaching a threshold difference from the strategic allocation 420, e.g., when the GIA allocation has a greater than 10% difference from the strategic allocation 420; or upon receipt of instructions to do so, e.g., instructions from generated by investment manager engine 110 or received from user actively managing the investment fund.

To rebalance investment funds 145, portfolio module 410 may receive the investment fund 145, strategic allocation 420 associated with investment fund 145, and strategic allocation rules 430. Portfolio module 410 may then compare the strategic allocation 420 to assets in stock portfolio 220, bond portfolio 230 and GIA portfolio 240 and use strategic allocation rules 430 determine whether the comparison violates one or more rules 430. The one or more allocation rules 430 may include one or more thresholds, such as that the GIA allocation has a greater than 10% difference from the strategic allocation 420 discussed above. Based on the comparison, portfolio module 410 may cause allocation module 260 to rebalance the one or more portfolios 220-240 in the investment fund 145 by causing allocation module 260 to purchase or sell assets in portfolios 220-240. The output of portfolio module 410 is a rebalanced investment fund 145A.

As discussed above, investment manager engine 110 allocates monetary contribution 250 into investment fund 145 by purchasing assets. Investment manager engine 110 also transacts assets, such as electronically purchasing or selling units of stocks or bonds on one or more market exchanges 165 or redeeming GIA units 310 via the third-party distribution engine 130. As discussed above, distributed system 100 may be coupled over network 140 to one or more market exchanges 165. Market exchanges 165 may be stock exchanges, bond exchanges, etc., that may provide investment manager engine 110 with quotes for stock and bond prices and provide investment manager engine 110 with an interface for buying and selling assets.

Figure 5A:
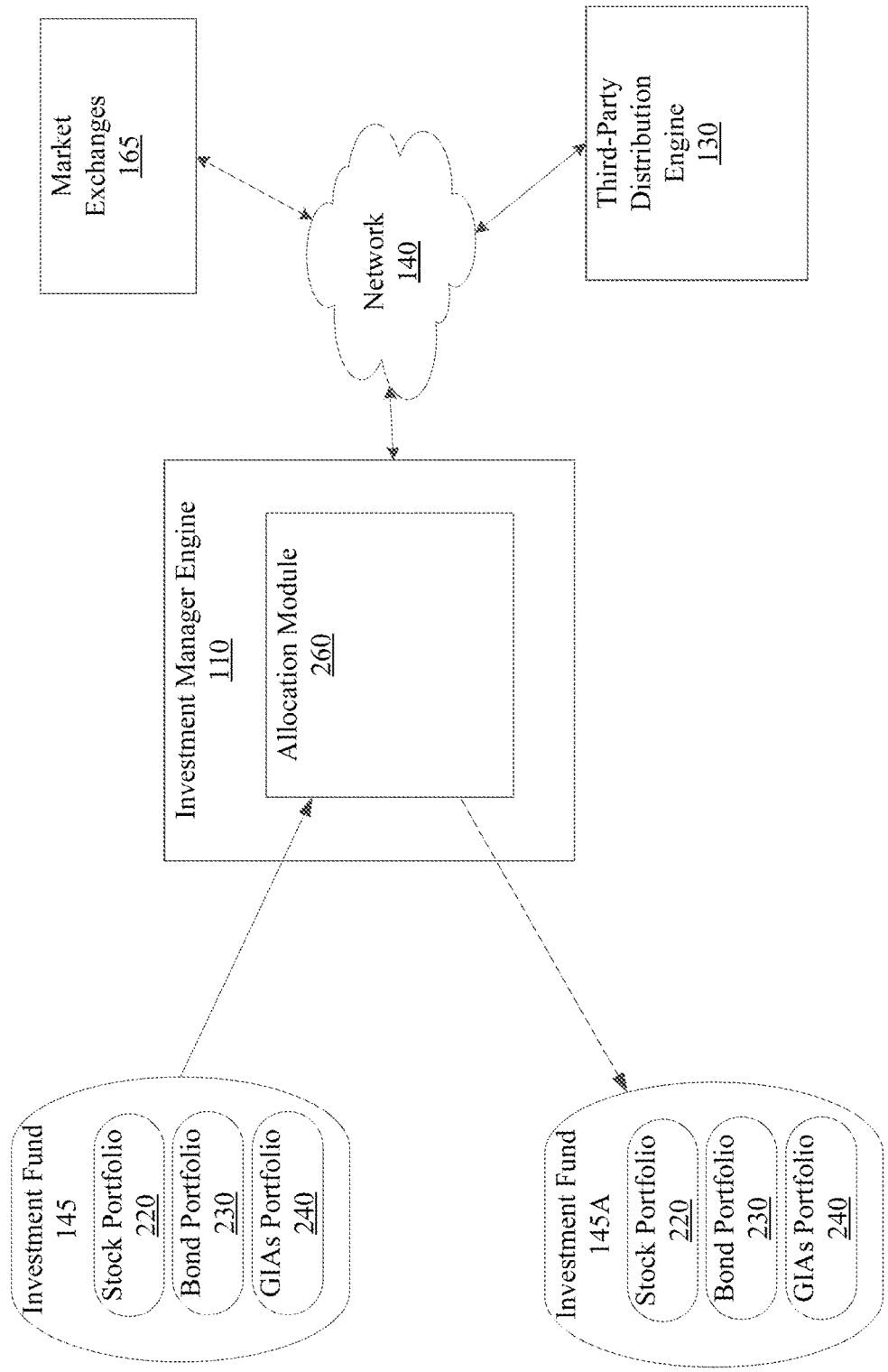
Figure 5B:
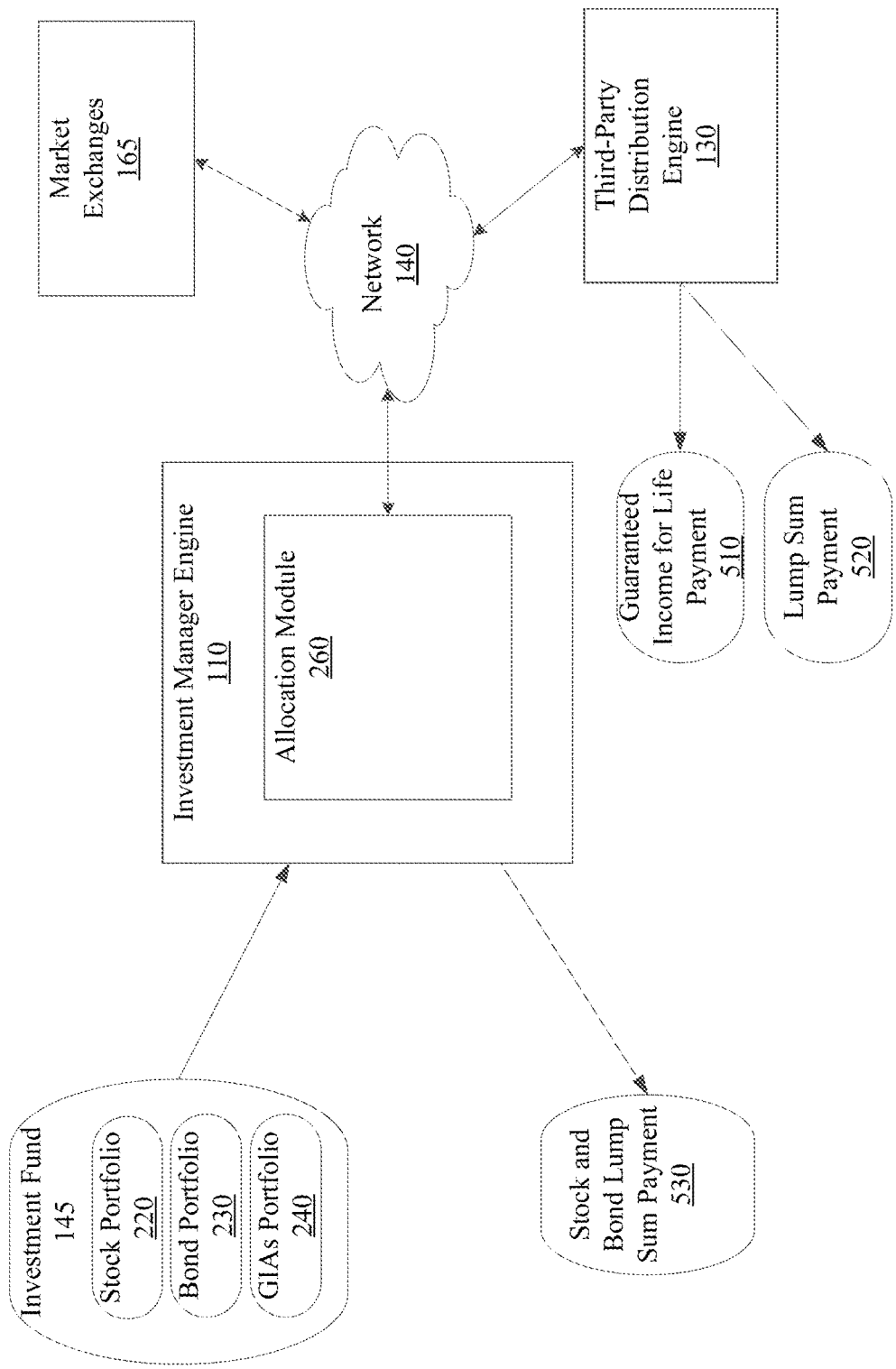

FIGS. 5A and 5B are block diagrams 500A and 500B of the investment manager engine allocating assets to an investment fund, according to an embodiment. As illustrated in FIG. 5A, allocation module 260 may allocate or reallocate assets in investment fund 145. Allocation module 260 may allocate assets by buying and selling assets, e.g. stocks in stock portfolio 220 and bonds in bond portfolio 230 using market exchanges 165, and GIA units 310 using third-party distribution engine 130.

Allocation module 260 may choose to buy or sell interests in the GIA units 310 on daily basis. Though the price of the GIA unit 310 may fluctuate, upon purchase of GIA units 310 by the allocation module 260, the future payout guaranteed by the third-party distribution engine 130 for the GIA unit 310 becomes immutable. As such, purchasing GIA units 310 on days when the price of the GIA unit 310 is lower may provide greater future annual income than on other days where the price of the GIA unit 310 is greater (which greater price causes the purchase of fewer GIA units 310 for the same contribution amount, due to the increased cost per GIA unit 310). Thus, allocation module 260 may change the state of investment fund 145 to investment fund 145A by changing the number of stocks, bonds, and GIA units 310 in investment fund 145.

As illustrated in FIG. 5B, allocation module 260 may liquidate the entire investment fund 145. This may occur upon reaching the predetermined date or time, or prescribed window of time, during the lifetime of the investment fund 145, at which point the guaranteed asset income portfolio 240 may be redeemed. In some instances, investment managing application 125 may receive instructions from the investor that elect to begin receiving a guaranteed annual income for life payment 510 from the third-party distribution engine 130. Investment managing application 125 may also receive instructions for a lump sum payment 520 from the investment manager engine 110. The investment managing application 125 may transmit the instructions via network 140 to investment manager engine 110. Either the annual income for life payment 510 or lump sum payment 520 result from the liquidation of the guaranteed asset income portfolio 240, typically, the sale by the investment manager engine 110 of all GIA units 310 in the GIA portfolio 240 back to the third-party distribution engine 130.

The guaranteed annual income for life payment 510 is based on the guaranteed annual income component 330 of the GIA units 310 in the GIA portfolio 240. The lump sum payment 520 is based on the price of GIA units 310 on the day the lump sum payment is redeemed. For example, if the price of one GIA unit 310 is $10, the investor is the sole investor in the investment fund 145, and the GIA portfolio 240 of the investment fund has 10,000 units, the investment manager engine 110 will typically sell all 10,000 units to the third-party distribution engine 130 in exchange for $100,000. Third-party distribution engine 130 may then distribute the amount to an investor as a $100,000 lump sum payment 520. In this situation, allocation module 260 may liquidate the other portfolios, such as the stock portfolio 220 and bond portfolio 230 in the investment fund 145 by selling the stocks and bonds on the market exchanges 165. Investment manager engine 110 may then distribute the totality of the sums realized from stock portfolio 220 and bond portfolio 230 to the investor as a stock and bond lump sum payment 530. However, if the same investor elects not to redeem on that day, but chooses instead to redeem the investment in the investment fund 145 the following business day, where the price of one GIA unit is $11, the investor will receive a $110,000 lump sum payment following the sale, by the investment manager engine 110 of the 10,000 GIA units 310 to the third-party distribution engine 130, at the transactable price of $11.

To liquidate GIA units 310, allocation module 260 may generate a message to third-party distribution engine 130 with instructions to purchase a number of GIA units 310 at a transactable price stored in transactable price component 320. The message may also include an indicator that indicates whether, upon liquidating, third-party distribution engine 130 should distribute guaranteed income for life payment 510 or lump sum payment 520. In some cases, investment manager engine 110 may remit the amount that the third-party distribution engine 130 used to purchase GIA units 310 back to third-party distribution engine 130 for distribution to the investor.

In some embodiments, before the predetermined date or window of time, redemption of GIA units 310 is capped. The cap may be based on an electronic agreement between the third-party distribution engine 130 and the investment manager engine 110 and/or the investor. For example, early redemption of GIA units 310 may be capped at 2% of the GIA portfolio 240 per month. Depending upon the embodiment, rebalancing the investment fund 145 to bring it in line with a strategic allocation 420 is limited by the cap on redeeming GIA units 310. For example, if the cap on redemption of GIA units 310 is 2% per month, and the investment fund's 145 allocation to GIA units 310 has strayed from a strategic allocation by 4%, it would take two months to bring the investment fund 145 in line with the strategic allocation 420. In another example, if the cap on redemption of GIA units 310 is 1% per month, and the investment fund's 145 allocation to GIA units 310 has strayed from a strategic allocation by 4%, it would take four months to bring the investment fund 145 in line with the strategic allocation 420. In this manner, third-party distribution engines 130 can avoid unexpectedly high rates of redemption of GIA units 310.

In other embodiments, investment managing application 125 may transmit a message that requests redemption of GIA units 310 before a predetermined time or window of time. In this case, investment manager engine 110 may generate a message to third-party distribution engine 130 that includes instructions for third-party distribution engine 130 to purchase GIA units 310 without a 2% cap or another cap.

Figure 6:
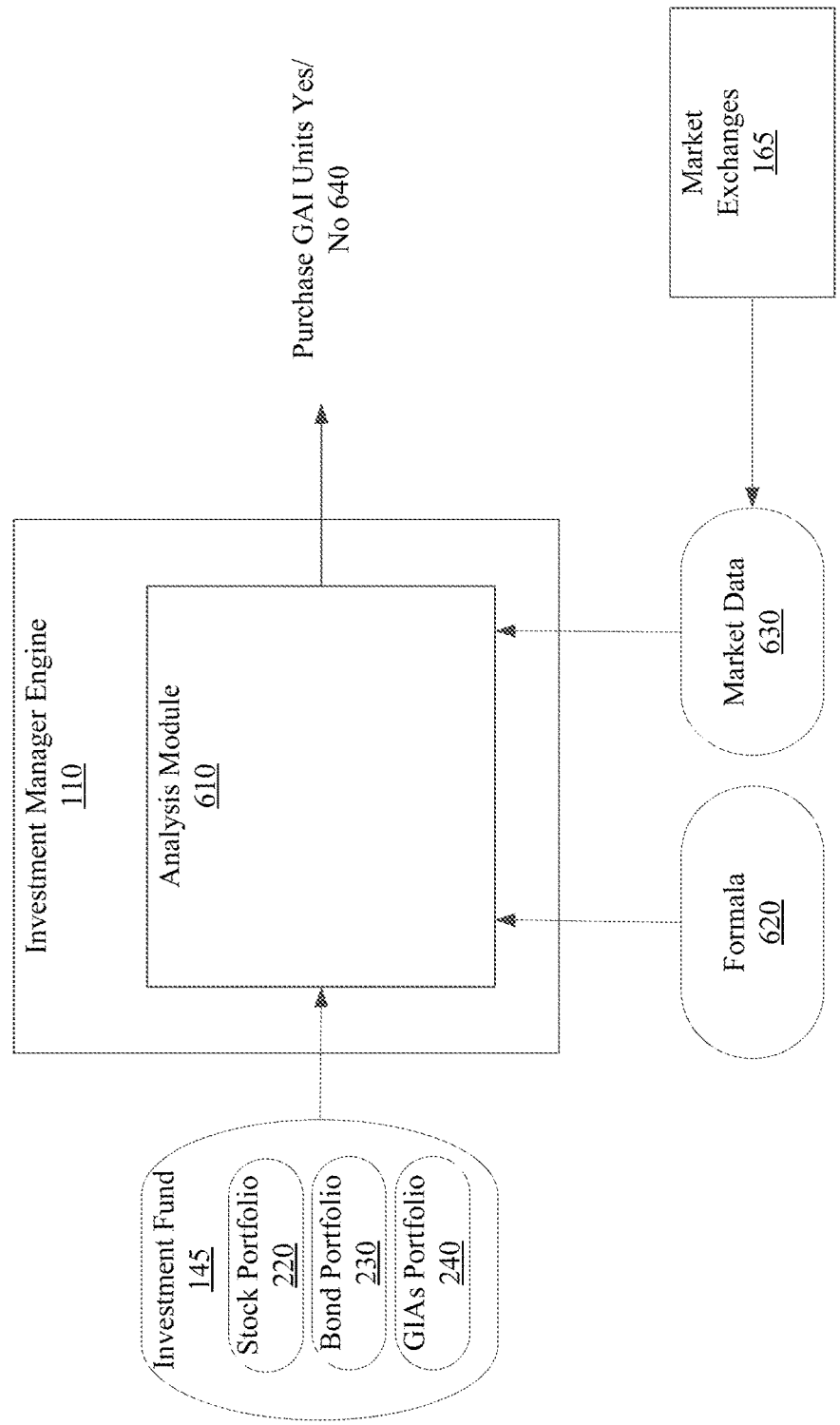

Investment manager engine 110 may also analyze whether to purchase or sell GIA units 310. FIG. 6 is a block diagram of an investment manager engine analyzing whether to purchase or sell GIA units in an investment fund, according to an embodiment. As illustrated in FIG. 6, investment manager engine 110 may include an analysis module 610. Analysis module 610 performs analysis to determine whether to purchase or sell GIA units 310. Analysis module 610 may traverse investment funds 145 accessible to investment manager engine 110. For each investment fund, investment manager engine 110 may calculate the price of GIA unit 310 based on an agreed upon formula 620 and current data, e.g., market data 630 such as the price of a particular stock, bond, or one or more combinations thereof. As discussed above, investment manager engine 110 may receive market data 630 from one or more market exchanges 165 in real time or at preconfigured intervals. In some case, market data 630 may be aggregated per stock or bond on per minute, hour, day or other configurable basis before being provided to investment manager engine 110. Formula 620 may be stored in memory included in or accessible to investment manager engine 110.

Analysis module 610 may evaluate the transactable price in transactable price component 320 of the GIA units 310 on daily basis to determine whether to purchase GIA units 310. If analysis module 610 determines that the price is agreeable (i.e., determines to purchase interests), investment manager engine 110 may purchase additional GIA units 310, using a received monetary contribution 250 and/or via reallocation of assets in investment fund 145 as discussed in FIGS. 2 and 5A. If analysis module 610 determines that the price is not agreeable (i.e., determines to not purchase interests), the investment manager engine 110 may elect to not purchase additional GIA units 310 or to sell GIA units 310, and may instead purchase other assets, such as stocks or bonds for portfolios 220 and 230, or retain cash in investment fund 145.

Analysis module 610 may perform the evaluation of whether to purchase GIA units 310 on a given day at the transactable price stored in transactable price component 320 by comparing the transactable price in transactable price component 320 of GIA units 310 to an index tracking a median cost of lifetime income or other comparison index as appropriate, as well as other factors, such as historic GIA unit prices. Analysis module 610 compares the index with the transactable price in transactable price component 320 of the GIA unit 310 using the techniques described below. The index may be calculated based on several variables, including one or more of the following: inflation predictions, risk evaluation, interest rates, mortality expectancy, age, observable annuity prices, and/or the prices of one or more equities and/or bonds. Analysis module 610 may use the index to estimate an attractive target price of the guaranteed income provided by one GIA unit 310 and determine whether to purchase GIA units 310 based on comparing the estimated target price to the actual price of one unit of the GAI. For example, if the actual price is more than a threshold amount greater than the estimated price, analysis module 610 may elect not to purchase GIA units 310. The output of analysis module is an indication 640 that indicates whether to purchase GIA units 310.

Depending upon the embodiment, the reference benchmark may be used in any of a variety of alternative ways. In one embodiment, the investment manager engine 110 and the third-party distribution engine 130 may buy and sell GIA units 310 for the price determined based on the index level of the reference benchmark. In another embodiment, the investment manager engine 110 and the third-party distribution engine 130 may buy and sell GIA units 310 at the price determined based on the index level of the reference benchmark, but the investment manager engine 110 may first validate the price against a different index to assess whether the price is agreeable. In another embodiment, the investment manager engine 110 and the third-party distribution engine 130 can buy and sell GIA units 310 at the price determined based on the index level of the reference benchmark, but the third-party distribution engine 130 may quote an alternative (typically, lower) price other than the determined price, and investment manager engine 110 may choose one of the prices, and may also check whether each price is agreeable.

In an embodiment, rather than track a reference benchmark to determine GIA unit 310 price, the third-party distribution engine 130 and the investment manager engine 110 and/or investor may agree upon a formulaic GIA unit 310 valuation methodology, namely formula 620, such as:

$$\text{value} = \sum_{t=1}^{\infty} (S_t \times (\text{Nominal } CF_t) \times df_t)$$

where value is the price of the GIA unit 310, t is time, $S_t$ is a survival variable, Nominal $CF_t$ is a nominal cash flow, and $df_t$ is a discount factor. The survival variable is a probability of the investor being alive at time t, as determined based on actuarial data communicated upon between the third-party distribution engine 130 and the investment manager engine 110, such as a particular actuarial table. The nominal cash flow is the agreed guaranteed annual income of one GIA unit 310, such as $1. The discount factor is a discount rate used to determine the present value of future cash flows, and may be derived from market indices, such as a U.S. treasury yield curve. The analysis module 610 may calculate this value and use it to determine whether to purchase one or more GIA units 310. Similar to the reference benchmark, third-party distribution engine 130 and the investment manager engine 110 may periodically renegotiate the unit valuation methodology, such as the actuarial data used, the nominal cash flow, and/or the discount factor.

In an embodiment, a guaranteed income asset portfolio 240 may include GIA units 310 from more than one third-party distribution engine 130, where each third-party distribution engine 130 offers different GIA units 310, e.g., GAIs with different guaranteed annual income components 330 or unit valuation methodologies. The analysis module 610 may compare the relative values of GIA units 310 from different third-party distribution engines 130 to determine which to purchase at a given time or may determine a particular ratio to employ as part of a strategic allocation 420.

Figure 7:
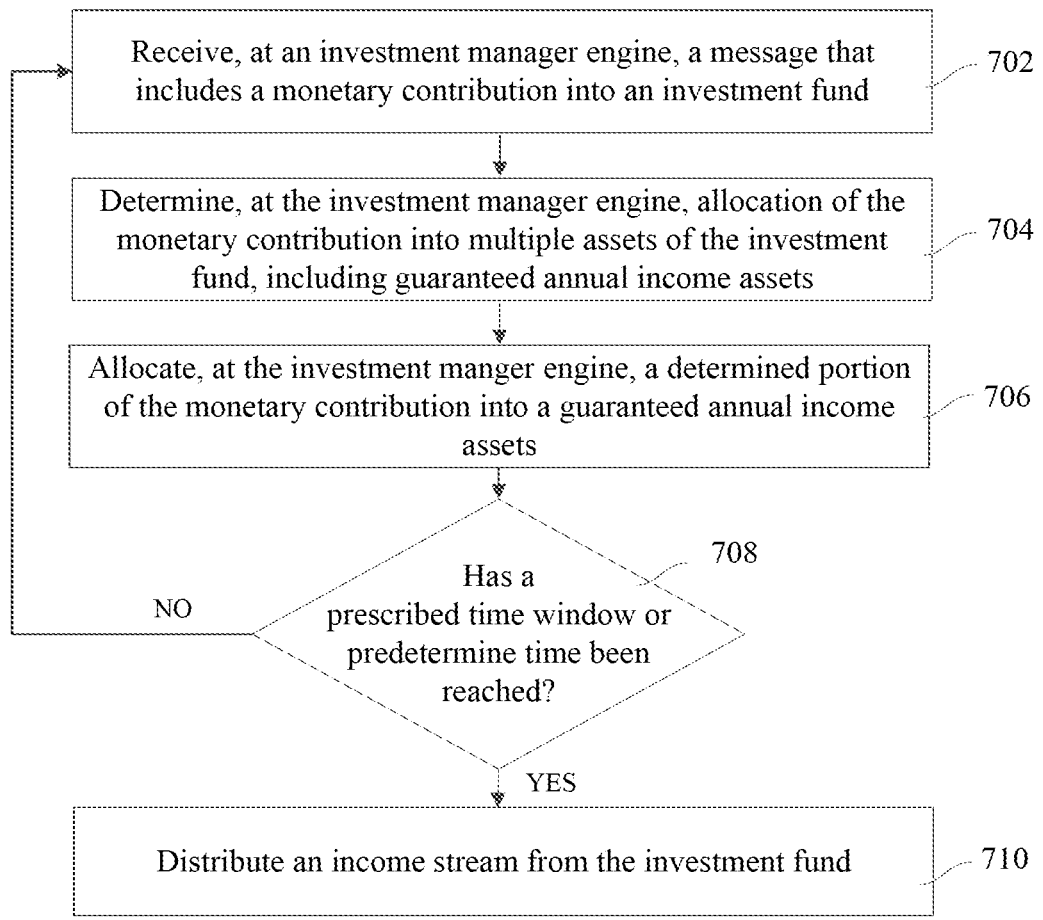
FIG. 7 illustrates a method for acquiring a guaranteed annual income stream, according to an embodiment.

FIG. 7 illustrates a method 700 for acquiring a guaranteed annual income stream, according to one embodiment. Notably, operations 702-706 of method 700 may repeat at predefined intervals, such as on monthly basis.

At operation 702, a message indicating monetary contribution is received. Investment manager engine 110 receives a message that includes monetary contribution 250 into investment fund 145 from investment source server 135. The investment fund 145 is associated with the investor or multiple investors.

At operation 704, allocation for monetary contribution is determined. The investment manager engine 110 determines allocations for monetary contribution 250 to one or more assets in investment fund 145. The example assets may include stocks, bonds, and/or guaranteed income assets that may be included in portfolios 220-240 of investment fund 145 associated with the investor. Investment manager engine 110 may identify investment fund 145 by comparing a user identifier in the message received in operation 702 to user profile 155 and investment fund 145 associated with the user profile 155. As described above, allocation module 260 within investment manager engine 110 may determine the allocation based on a preset strategic allocation 420 or may determine the allocation based on analysis of the market data 630 made by analysis module 610, and in particular the performance and forecasts for the assets among which all or a portion of monetary contribution 250 is to be allocated. Allocation module 260 may also determine allocation based on the weights of assets, e.g. weights of stocks and/or bonds in stock portfolio 220 and/or bond portfolio 230 in investment fund 145.

At operation 706, monetary contribution is allocated into guaranteed annual income assets. For example, investment manager engine 110 may allocate at least a portion of the monetary contribution 250 determined in operation 706 to GIA units 310, according to the determined allocation to provide a guaranteed annual income for life payment 510 or lump sum payment 520 upon a predetermined date, as described herein. As discussed above, investment manager engine 110 may allocate the determined portion of monetary contribution 250 by transmitting instructions for purchasing one or more GIA units 310 to third-party distribution engine 130.

At operation 708, a determination whether a prescribed time window or predetermined time has been reached is made. Investment manager engine 110 may determine whether the predetermined time window or predefined time associated with the GIA portfolio 240 has been reached. The prescribed time window or predefined time may be user specific and stored in the user profile 155 or GIA portfolio 240 in investment fund 145. If investment manager engine 110 determines that the predetermined time window or predetermined time has been reached, method 700 proceeds to operation 710, otherwise to operation 702 where investment manager engine 110 receives another monetary contribution 250.

At operation 710, at the predetermined time window or predetermined time, a guaranteed annual income stream is distributed. During prescribed time window or predetermined time, investment manager engine 110 may cause the guaranteed annual income stream to be distributed to the investor. This may involve allocation module 260 redeeming GIA units 310 in investment fund 145 to third-party distribution engine 130 and causing third-party distribution engine 130 to provide lump sum payment 520 to the investor. Alternatively, allocation module 260 may redeem the GIA units 310 in investment fund 145 to third-party distribution engine 130 and cause third-party distribution engine 130 to provide guaranteed annual income for life payment 510 to the investor. The guaranteed annual income for life payment 510 is the sum of the guaranteed annual income provided by each GIA unit 310 which was locked in upon purchase. For example, if the investment fund 145 includes two GIA units 310, where a first of GIA units 310 provides $1 in guaranteed annual income and a second of the GIA units 310 provides $1.50 in guaranteed annual income, the third-party distribution engine 130 will annually pay $2.50 to the investor upon redemption of the first and second GIA units 310.

In some cases, at the predetermined time window or predetermined time, investment manager engine 110 may automatically generate instructions for selling GIA units 310 and include the instructions in a message transmitted to third-party distribution engine 130. In other cases, investment manager engine 110 may initially receive instructions for selling GIA units 310 from investment managing application 125 and automatically generate a message with instructions for selling GIA units 310 upon receiving instructions from investment managing application 125. Upon receipt of the message, third-party distribution engine 130 may purchase GIA units 310 from investment manager engine 110 and provide a distribution of the guaranteed income to the investor. Investment manager engine 110 may remit the proceeds from the sale of GIA units 310 to third-party distribution engine 130 so that the third-party distribution engine 130 may fund lump sum payment 520 or annual income for life payment 510 to the investor. Additionally, allocation module 260 may also liquidate the stocks in stock portfolio 220 and bonds in bond portfolio 230 by generating instructions to sell the stocks and bonds and communicating a message that includes the instructions to one or more market exchanges 165.

Figure 8:
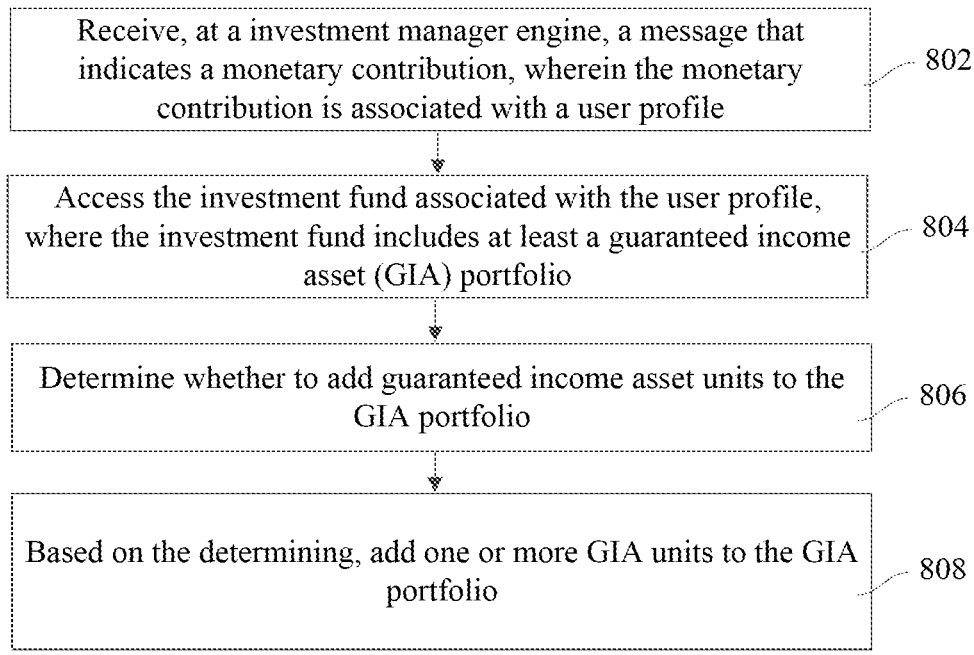
FIG. 8 illustrates a method for maintaining a guaranteed annual income stream, according to an embodiment.

FIG. 8 illustrates a method 800 for electronically adding guaranteed annual income units to an investment fund, according to one embodiment. Prior to method 800, investment manager engine 110 has created investment fund that includes multiple portfolios 220-240.

At operation 802, a monetary contribution is received. For example, investment manager engine 110 receives a message that includes monetary contribution 250 and a user identifier from investment source server 135.

At operation 804, an investment fund is accessed. Investment manager engine 110, upon receipt of the message that includes monetary contribution 250, may use a user identifier in the message to identify a corresponding user profile 155 and investment fund 145 that is associated with the user profile 155. Investment fund 145 may include one or more portfolios 220-240, where stock portfolios 220 includes stocks, bond portfolio 230 includes bonds and GIA portfolio 240 includes GIA units 310. Investment fund 145 may also include portfolios that include other assets or include a single portfolio with mixed assets.

At operation 806, a determination of whether to add GIA units to the GIA portfolio is made. The investment manager engine 110 uses analysis module 610 to determine whether to add additional GIA units 310 to the GIA portfolio 240 using techniques described above and based on predetermined formula 620 and/or market data 630.

At operation 808, the GIA units are added to the GIA portfolio. For example, investment manager engine 110 may communicate a message with instructions to third-party distribution engine 130 to purchase one or more GIA units 310 using at least a portion of monetary contribution 250.

The disclosed techniques provide benefits and advantages that include, for example, guaranteed income assets that are practically tradable on daily basis and that are fully price transparent. Such guaranteed income assets may meet regulatory criteria, and therefore investment funds including them may qualify in the United States as QDIAs under the Employee Retirement Income Security Act (ERISA). Furthermore, the disclosed techniques provide an understanding of characteristics of the guaranteed income asset class, such as the securities constituting the reference benchmark that determine the price fluctuations in the GIA units. As such, traditional methods of fixed income analysis, risk analysis, and portfolio construction may be applied, which could not previously be done when traditional annuity contracts are purchased by investment manager engine 110 for ownership in investment funds. Such traditional annuity contracts are neither transparent, liquid, nor "priced" and are therefore not susceptible to risk analysis in the same way as more traditional asset classes. The disclosed techniques address this opacity and as such, the investment manager engine 110 may better manage the investment fund by better optimizing the allocation of funds among stocks, bonds, and guaranteed income assets, to provide greater transparency as to the factors that influence the investment risks associated with the investment fund, and to have access to greater information in optimizing the risk/return tradeoffs inherent in financial investment.

Figure 9:
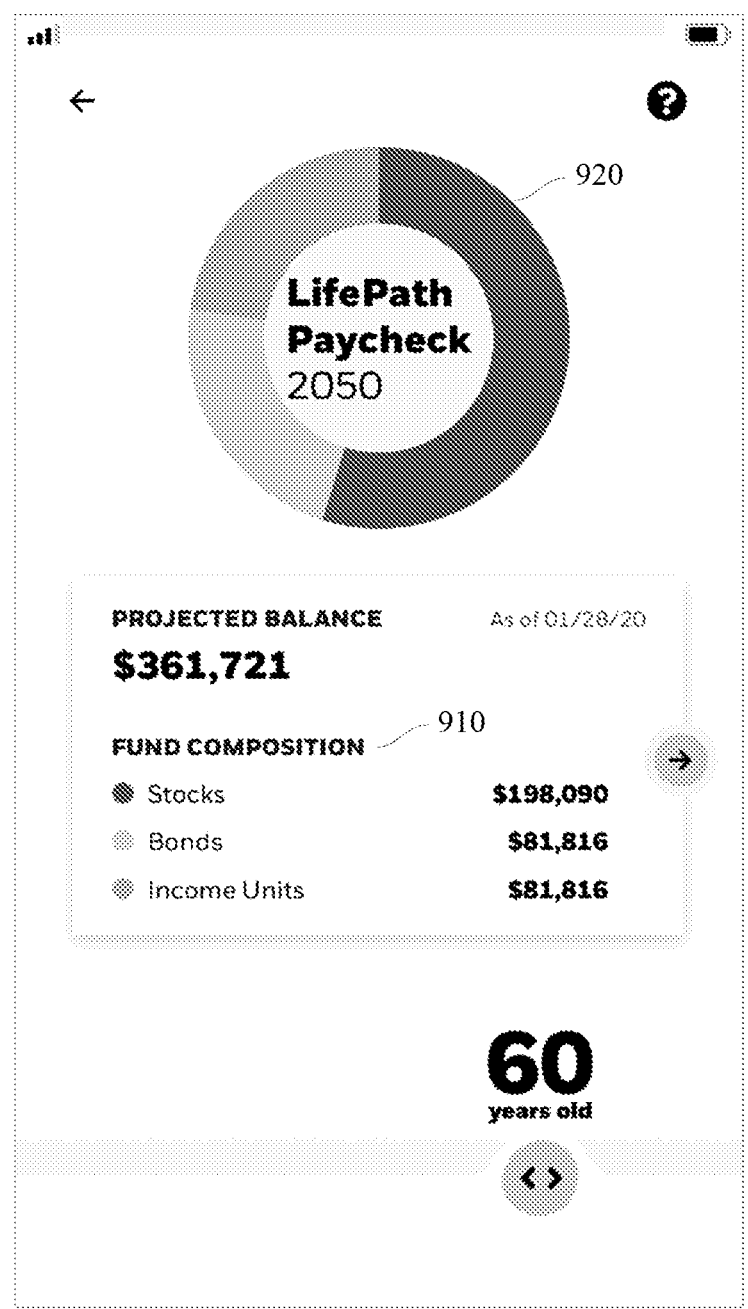
FIG. 9 is a diagram of an application interface for displaying a value of an investment fund, according to an embodiment.

FIG. 9 is a diagram 900 of an application interface of an investment managing application displaying values of assets in an investment fund, according to an embodiment. After a user has registered with investment managing application 125, investment managing application 125 may retrieve and display the value of the portfolios 220-240 of investment fund 145 that is associated with the user. In one instance, investment managing application 125 may display a fund composition 910 that includes the current values for stocks in stock portfolio 220, bonds in bond portfolio 230, and GIA units 310 in GIA portfolio 240. In another instance, investment managing application 125 may display fund composition 910 that is a projected value for stocks in stock portfolio 220, bonds in bond portfolio 230, and GIA units 310 in GIA portfolio 240 at the beginning of the prescribed redemption time or redemption time window, which the user can adjust by increasing or decreasing the user's projected age at redemption. Investment managing application 125 may also display the fund composition using a visual fund ring 920 that represents investment fund 145 allocations with portions of the ring associated with different assets, e.g. stocks, bonds, GIA units 310 in proportion to their respective values.

Investment managing application 125 may display the portfolios 220-240 of investment fund 145 by requesting the values from investment manager engine 110 using a request message. The request message includes a user identifier of a user that logged into the investment managing application 125 using user credentials. In response to the request, investment managing application 125 may receive a response message that includes the data associated with portfolios 220-240 of investment fund 145. Investment managing application 125 may parse the values in the message and format using code written in a programming language, such as Objective-C, Swift, C++, C#, Java, HTML, XML, etc. Investment managing application 125 may then format the values and display the values as fund composition 910 or fund ring 920.

Figure 10:
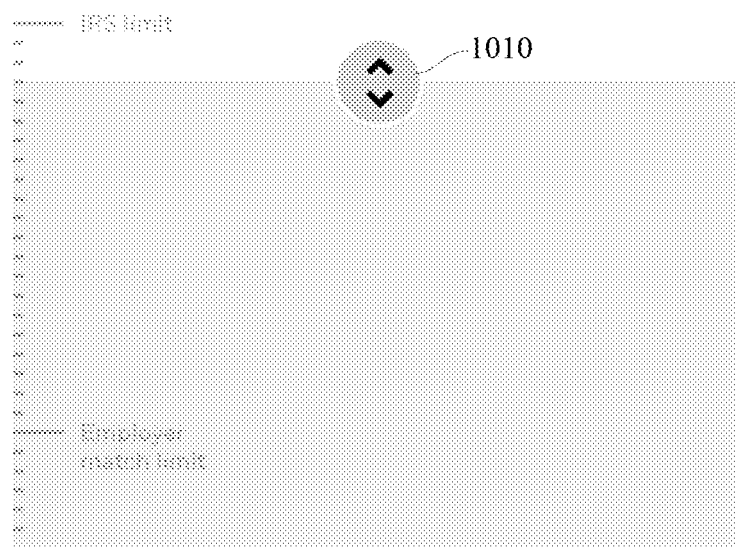
FIG. 10 is a diagram of an application interface for allocating a contribution to an investment fund, according to an embodiment.

FIG. 10 is a diagram 1000 of an application interface of an investment managing application displaying an application interface for setting up a monetary contribution, according to aspects of the disclosure. After investment managing application 125 receives user credentials, investment managing application 125 may display an interface that receives user input associated with monetary contribution 250. Investment managing application 125 may display a current monetary contribution 250 and an interface, such as a button or a slider 1010 that may receive input that re-adjusts the value of monetary contribution 250. Button or slider 1010 may be associated with software code that in response to receiving user input may display the new monetary contribution and generate a message to investment source server 135 that includes the new value for monetary contribution 250. This allows the user to quickly and easily see how different contributions, within the user's employee match limit and the IRS limit, affects the user's portfolio value, which is especially beneficial is the user is on a client device 120 with limited screen or user interface space. If the user desires to make a change, the user can select a change contribution button to effect the change. Once investment source server 135 receives the change message, investment source server 135 may periodically transmit monetary contribution to investment manager engine 110 with the new contribution value.

Figure 11:
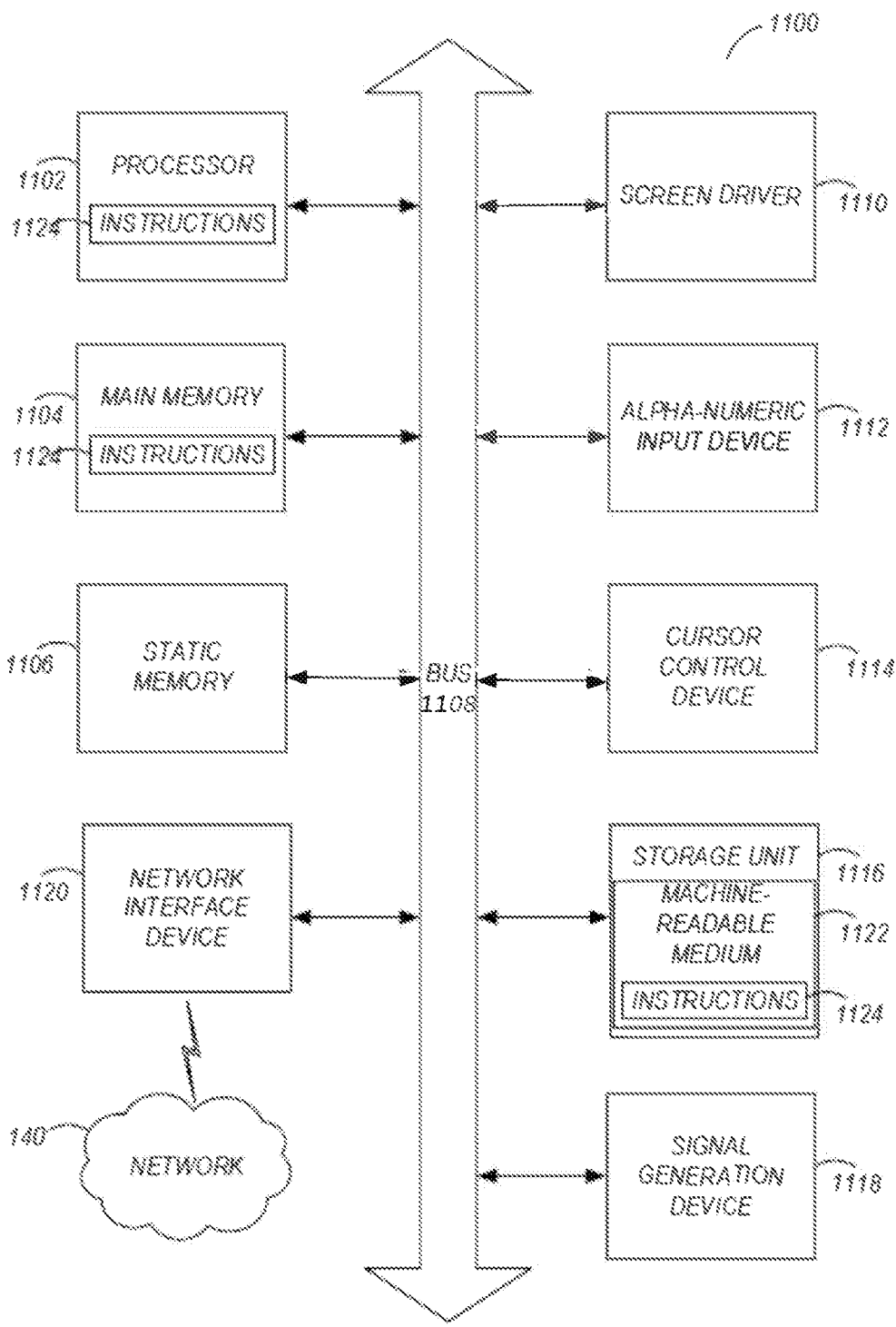
FIG. 11 is a block diagram illustrating components of an example machine able to read instructions from a machine-readable medium and execute them in one or more processors (or controllers) in accordance with one example embodiment.

FIG. 11 is a block diagram illustrating components of an example machine able to read instructions from a machine-readable medium and execute them in one or more processors (or controllers) in accordance with one example embodiment.

Specifically, FIG. 11 shows a diagrammatic representation of an example form of a computer system 1100. The computer system 1100 is a computing device that can be used to execute instructions 1124 (e.g., program code or software) for causing the machine to perform any one or more of the methodologies (or processes) described herein. The machine may operate as a standalone device or a connected (e.g., networked) device that connects to other machines. In a networked deployment, the machine may operate in the capacity of a server machine or a client machine in a client-server network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 1124 (sequential or otherwise) that specify actions to be taken by that machine. Further, while only a single machine is illustrated, the term "machine" shall also be taken to include any collection of machines that individually or jointly execute instructions 1124 to perform any one or more of the methodologies discussed herein. In addition, it is noted that not all the components noted in FIG. 11 may be necessary for a machine to be configured to execute the systems and/or processes described within the disclosure.

The example computer system 1100 includes one or more processing units (generally processor 1102). The processor 1102 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 1100 also includes a main memory 1104. The computer system may include a storage unit 1116. The processor 1102, memory 1104, and the storage unit 1116 communicate via a bus 1108.

In addition, the computer system 1100 can include a static memory 1106, a graphics display 1110 (e.g., to drive a plasma display panel (PDP), a liquid crystal display (LCD), or a projector). The computer system 1100 may also include alphanumeric input device 1112 (e.g., a keyboard), a cursor control device 1114 (e.g., a mouse, a trackball, a joystick, a motion sensor, or other pointing instrument), a signal generation device 1118 (e.g., a speaker), and a network interface device 1120, which also are configured to communicate via the bus 1108.

The storage unit 1116 includes a machine-readable medium 1122 on which is stored instructions 1124 (e.g., software) embodying any one or more of the methodologies or functions described herein. The instructions 1124 may also reside, completely or at least partially, within the main memory 1104 or within the processor 1102 (e.g., within a processor's cache memory) during execution thereof by the computer system 1100, the main memory 1104 and the processor 1102 also constituting machine-readable media. The instructions 1124 may be transmitted or received over the network 140 via the network interface device 1120.

While machine-readable medium 1122 is shown in an example embodiment to be a single medium, the term "machine-readable medium" should be taken to include a single medium or multiple media (e.g., a centralized or distributed database, or associated caches and servers) able to store the instructions 1124. The term "machine-readable medium" shall also be taken to include any medium that is capable of storing instructions 1124 for execution by the machine and that cause the machine to perform any one or more of the methodologies disclosed herein. The term "machine-readable medium" includes, but is not be limited to, data repositories in the form of solid-state memories, optical media, and magnetic media.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-11. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 1102, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for indexing data entries that may be executed through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A computer-implemented method for administering an investment fund, the method comprising:
maintaining, at an investment manager engine, one or more portfolios of the investment fund comprising at least one of stocks or bonds, and a guaranteed income portfolio comprising guaranteed income assets, wherein the guaranteed income assets are convertible to a guaranteed annual income stream and wherein a guaranteed income asset in the guaranteed income assets comprises a transactable price component and a guaranteed annual income component,
wherein the transactable price component is based on a unit valuation methodology comprising a formula based on a survival variable, a nominal cash flow, and a discount factor, and
wherein the guaranteed annual income component is a guaranteed annual income provided by a third-party distribution engine via the guaranteed annual income stream upon a redemption window;
causing to be displayed, on a graphical user interface display, an adjustable monetary contribution slider, wherein locations of the adjustable monetary contribution slider on the graphical user interface correspond to contribution amounts to the one or more portfolios;

causing a change in a location of the adjustable monitoring contribution slider on the graphical user interface, wherein the location of the adjustable monitoring contribution slider corresponds to a contribution amount from the contribution amounts to the one or more portfolios;

receiving, the contribution amount corresponding to the location of the adjustable monetary contribution slider on the graphical user interface display;

determining, at the investment manager engine, to add an additional guaranteed income asset to the guaranteed income portfolio; and adding, at the investment manager engine, the additional guaranteed income asset to the guaranteed income portfolio based on a portion of the contribution.

2. The method of claim 1, wherein determining to add the additional guaranteed income asset to the guaranteed income portfolio further comprises:

determining, using an analysis module of the investment manager engine, a cost of an amount of guaranteed annual income based on a current transactable values of the guaranteed income assets;

comparing the determined cost to a guaranteed income cost estimate, wherein the guaranteed income cost estimate includes an estimate of cost of the amount of guaranteed annual income; and determining that the comparing indicates at least a threshold difference by which the determined cost exceeds the guaranteed income cost estimate; and wherein adding additional guaranteed income assets to the guaranteed income portfolio is responsive to the determining that the comparison indicates at least the threshold difference.

3. The method of claim 1, wherein the guaranteed annual income component of the guaranteed income asset is immutable upon an addition of the guaranteed income asset to the guaranteed income portfolio.

4. The method of claim 1, further comprising:

determining a redemption window for the guaranteed income assets; and converting the guaranteed income assets into a guaranteed income stream based on guaranteed income components in the guaranteed income assets.

5. The method of claim 4, further comprising:

during the redemption window, generating a message to a distribution engine, the message comprising instructions to purchase a guaranteed income asset in the guaranteed income assets at a transactable price in a transactable price component of the guaranteed income asset to generate the guaranteed income stream based on a guaranteed income price in a guaranteed income component of the guaranteed income asset.

6. The method of claim 1, further comprising:

causing to be displayed, on the graphical user interface display, an investment fund composition comprising a value of the one or more portfolios of the at least one of stocks or bonds and a value of the guaranteed income portfolio.

7. The method of claim 1, further comprising:

causing to be displayed, on the graphical user interface display, a visual fund ring comprising investment fund allocations, wherein portions of the visual fund ring are in proportion to the investment fund allocations in the at least one of stocks or bonds and the guaranteed income assets.

8. A non-transitory computer-readable storage medium having instructions encoded thereon that, when executed by one or more processors, cause the one or more processors to:

maintain guaranteed income assets in a guaranteed income portfolio of an investment fund, wherein the guaranteed income assets are convertible to a guaranteed annual income stream within a predefined time window and wherein a guaranteed income asset in the guaranteed income assets comprises a transactable price component and a guaranteed annual income component, wherein the transactable price component is based on a net asset value of a reference benchmark, the reference benchmark including a set of assets agreed upon by an investment manager engine associated with the investment fund and a third-party distribution engine providing the guaranteed income asset, and wherein the guaranteed annual income component is a guaranteed annual income provided by the third-party distribution engine via the guaranteed annual income stream upon the predefined time window;

cause to be displayed, on a graphical user interface display, an adjustable monetary contribution slider, wherein locations of the adjustable monetary contribution slider on the graphical user interface display correspond to different contribution amounts between a first limit and a second limit;

causing a change in a location of the adjustable monitoring contribution slider on the graphical user interface, wherein the location of the adjustable monitoring contribution slider corresponds to a contribution amount from the contribution amounts to the one or more portfolios;

receive a message that includes the contribution amount for the investment fund corresponding to the location of the adjustable monetary contribution slider on the graphical user interface display;

determine to add new guaranteed income assets to the guaranteed income portfolio; and responsive to the determining, add the new guaranteed income assets to the guaranteed income portfolio using at least a portion of the contribution.

9. The non-transitory computer-readable storage medium of claim 8, wherein determining to add the new guaranteed income assets to the guaranteed income portfolio comprises:

determine a cost of an amount of guaranteed annual income based on a current transactable value of the guaranteed income assets;

compare the determined cost to a guaranteed income cost estimate, wherein the guaranteed income cost estimate includes an estimate of cost of the amount of guaranteed annual income; and determine that the comparison indicates at least a threshold difference by which the determined cost exceeds the guaranteed income cost estimate; and add the new guaranteed income assets to the guaranteed income portfolio responsive to the determination of whether the comparison indicates at least the threshold difference.

10. The non-transitory computer-readable storage medium of claim 8, wherein the guaranteed annual income component of the guaranteed income asset is immutable upon an addition to the guaranteed income portfolio.

11. The non-transitory computer-readable storage medium of claim 8, further comprising:
during the predefined time window, generate a second message to a distribution engine, the second message comprising instructions to purchase a guaranteed income asset at a transactable price stored in a transactable price component of the guaranteed income asset to generate a guaranteed income stream based on a price in a guaranteed income component in the guaranteed income asset.

12. The non-transitory computer-readable storage medium of claim 8, further comprising:
cause to be displayed, on the graphical user interface display, an investment fund composition comprising a value of the one or more portfolios in the investment fund comprising at least one of stocks or bonds and a value of the guaranteed income portfolio in the investment fund comprising guaranteed income assets.

13. A system, comprising:
a non-transitory memory; and
one or more hardware processors coupled to the non-transitory memory and configured to execute instructions from the non-transitory memory to cause the system to perform operations comprising:
maintaining one or more portfolios of an investment fund, wherein the one or more portfolios comprise at least one of stocks and bonds and wherein the one or more portfolios are stored as software objects;
maintaining guaranteed income assets in a guaranteed income portfolio of the investment fund, wherein the guaranteed income assets are convertible to a guaranteed annual income stream within a predefined time window, wherein a guaranteed income asset in the guaranteed income assets comprises a transactable price component and a guaranteed annual income component,
wherein the transactable price component is based on a net asset value of a reference benchmark, the reference benchmark including a set of assets agreed upon by an investment manager engine managing the investment fund and a third-party distribution engine providing the guaranteed income asset, and
wherein the guaranteed annual income component is a guaranteed annual income provided by the third-party distribution engine via the guaranteed annual income stream upon the predefined time window, and wherein the guaranteed income portfolio is stored as a guaranteed income software object;
causing an adjustable monitoring contribution slider to be displayed on a graphical user interface, wherein locations of the adjustable monetary contribution slider on the graphical user interface correspond to contribution amounts to the one or more portfolios;
causing a change in a location of the adjustable monitoring contribution slider displayed on the graphical user interface, wherein the location of the adjustable monitoring contribution slider on the graphical user interface corresponds to a contribution amount from the contribution amounts to the one or more portfolios;
receiving a message that includes the contribution amount for the investment fund;
determining to add new guaranteed income assets to the guaranteed income portfolio; and
responsive to determining, adding the new guaranteed income assets to the guaranteed income portfolio using at least a portion of the contribution.

14. The system of claim 13, wherein determining to add the new guaranteed income assets to the guaranteed income portfolio comprises:
determining a cost of an amount of guaranteed annual income based on a current transactable value of the guaranteed income assets;
comparing the determined cost to a guaranteed income cost estimate, wherein the guaranteed income cost estimate includes an estimate of cost of the amount of guaranteed annual income; and
determining that the comparison indicates at least a threshold difference by which the determined cost exceeds the guaranteed income cost estimate; and
wherein adding the new guaranteed income assets to the guaranteed income portfolio is responsive to the determination of whether the comparison indicates at least the threshold difference.

15. The system of claim 13, wherein the guaranteed annual income component of the guaranteed income asset is immutable upon an addition to the guaranteed income portfolio.

16. The system of claim 13, wherein the adjustable monetary contribution slider is located on the graphical user interface between a first location corresponding to a minimum value and a second location corresponding to a maximum value of the contribution.

17. The system of claim 13, further comprising:
determining a redemption window for the guaranteed income assets; and
converting the guaranteed income assets into a guaranteed income stream based on guaranteed income components in the guaranteed income assets.

18. The system of claim 17, further comprising:
during the redemption window, generating a message to a distribution engine, the message comprising instructions to purchase a guaranteed income asset in the guaranteed income assets at a transactable price in a transactable price component of the guaranteed income asset to generate the guaranteed income stream based on a guaranteed income price in a guaranteed income component of the guaranteed income asset.

19. The system of claim 13, further comprising:
causing to be displayed, on the graphical user interface display, an investment fund composition comprising a value of the one or more portfolios of the at least one of stocks or bonds and a value of the guaranteed income portfolio.

20. The system of claim 13, further comprising:
causing to be displayed, on the graphical user interface display, a visual fund ring comprising investment fund allocations, wherein portions of the visual fund ring are in proportion to the investment fund allocations in the at least one of stocks or bonds and the guaranteed income assets.

* * * * *

UNITED STATES PATENT AND TRADEMARK OFFICE
CERTIFICATE OF CORRECTION

PATENT NO. : 12,056,770 B2  
APPLICATION NO. : 18/178354  
DATED : August 6, 2024  
INVENTOR(S) : Matthew O'Hara, Daniel Yem and Daniel Basile It is certified that error appears in the above-identified patent and that said Letters Patent is hereby corrected as shown below:

In the Claims

At Column 22, Line 32, replace "causing a change" with "cause a change"

Signed and Sealed this  
Twenty-fourth Day of September, 2024

Katherine Kelly Vidal  
*Director of the United States Patent and Trademark Office*